(12) United States Patent
McConnell et al.

(10) Patent No.: US 9,276,632 B2
(45) Date of Patent: Mar. 1, 2016

(54) ANALOG SIGNAL DIVERSITY IN MULTICHANNEL COMMUNICATIONS

(71) Applicant: QUALCOMM Incorporated, San Diego, CA (US)

(72) Inventors: Richard Joseph McConnell, Rancho Cucamonga, CA (US); Faisal Mahmood Shad, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 14/132,815

(22) Filed: Dec. 18, 2013

(65) Prior Publication Data
US 2015/0171923 A1    Jun. 18, 2015

(51) Int. Cl.
*H04B 3/32* (2006.01)
*H04B 3/54* (2006.01)

(52) U.S. Cl.
CPC .................. *H04B 3/542* (2013.01); *H04B 3/32* (2013.01); *H04B 2203/5425* (2013.01)

(58) Field of Classification Search
CPC .............. H04B 3/00; H04B 3/02; H04B 3/03; H04B 3/23; H04B 3/232; H04B 3/32; H04B 3/54; H04B 3/542; H04B 3/56; H04B 2203/5404; H04B 2203/5425; H04B 2203/5429; H04B 2203/5462; H04B 2203/5483; H04B 2203/5495; H04L 25/026; H04L 25/0264; H04L 25/0272; H04L 25/0278; H04L 25/028; H04L 25/0292
USPC ............ 375/257, 258; 333/131, 14, 19, 24 R, 333/24.1, 24.2, 32, 35, 165, 166, 167, 177; 340/13.23
See application file for complete search history.

(56) References Cited

U.S. PATENT DOCUMENTS

| | | | |
|---|---|---|---|
| 7,962,118 B2 | 6/2011 | Schwager et al. | |
| 2010/0202565 A1* | 8/2010 | Abbasfar | 375/308 |
| 2011/0043374 A1 | 2/2011 | Bannister | |
| 2012/0020423 A1 | 1/2012 | Reuven et al. | |
| 2012/0114067 A1* | 5/2012 | Tsunoda | 375/295 |
| 2012/0163435 A1 | 6/2012 | Reuven et al. | |
| 2012/0308240 A1* | 12/2012 | Akiyama | 398/141 |
| 2013/0094596 A1 | 4/2013 | Borisov et al. | |

* cited by examiner

*Primary Examiner* — Young T Tse
(74) *Attorney, Agent, or Firm* — DeLizio Law, PLLC

(57) ABSTRACT

A multichannel communications medium may have two or more channels available for transmitting information. A first transmission signal and a second transmission signal may be prepared from a same analog signal to be transmitted on a first channel and a second channel. For example, a phase shift or amplitude shift may be performed on the first transmission signal or the second transmission signal. The first transmission signal may be transmitted via the first channel, and the second transmission signal may be transmitted via the second channel. The phase shift or amplitude shift may be performed by analog components that are less complex than digital signal processors used for digital signal diversity. The analog components may be digitally controlled. The analog signal diversity may utilize cost effective analog components to improve the performance of the communications system over single channel communications without requiring complex digital signal processing of multiple signal paths.

22 Claims, 10 Drawing Sheets

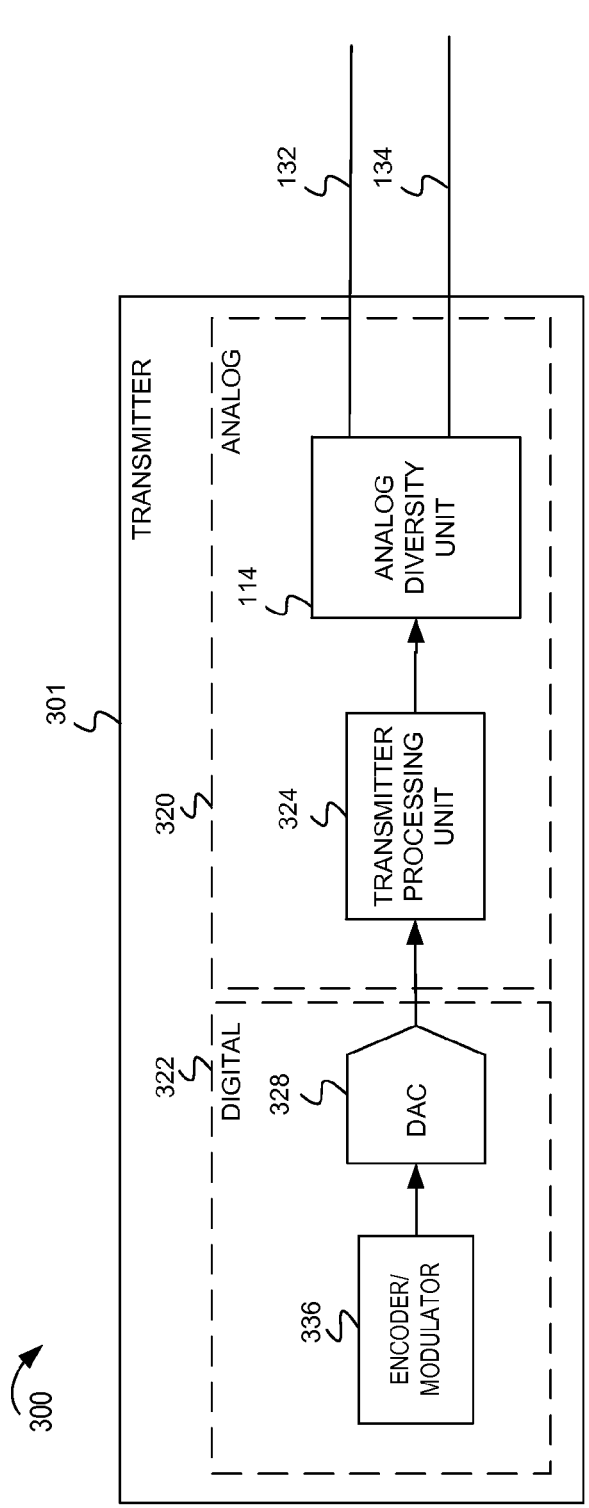
FIG. 3
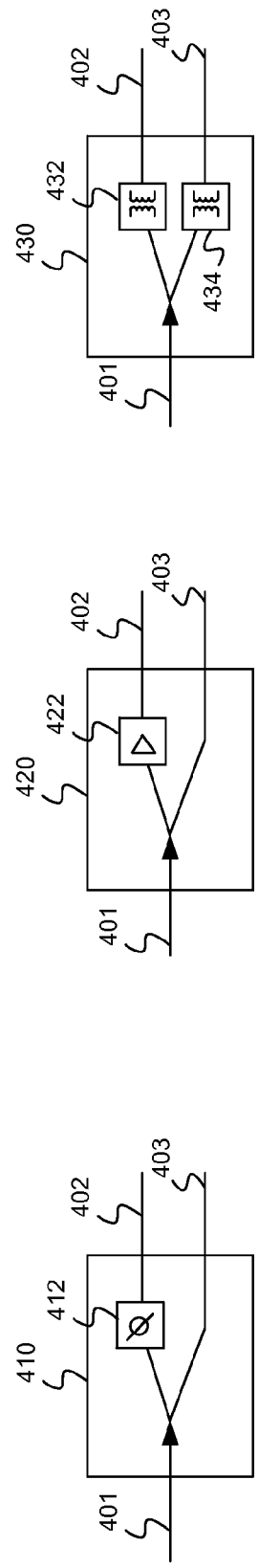
FIG. 4A
FIG. 4B
FIG. 4C

US 9,276,632 B2

ANALOG SIGNAL DIVERSITY IN MULTICHANNEL COMMUNICATIONS

TECHNICAL FIELD

Embodiments of the present disclosure generally relate to the field of communications systems, and, more particularly, to analog signal diversity in multichannel communications system.

BACKGROUND

Communications systems using conventional multiple-input multiple-output (MIMO) technology exploit spatial diversity at the transmitter and at the receiver to increase throughput compared to a single-input single-output (SISO) system. In a wire-line MIMO system, multiple physical channels may be defined using conductors of a communications medium. For example, a powerline may have three conductors (e.g., a line or hot wire, a neutral wire, and a ground or protective earth wire) bundled together in a sheath. A wire pair consisting of two conductors may be used together to define a physical channel. To implement MIMO for powerline communications (PLC), two of the conductors may be used to carry signals while a third conductor may serve as a reference for both of the two signal-carrying conductors. As such, it is possible to have two physical channels in MIMO for PLC.

Current technologies for utilizing a multichannel communications medium may employ complex techniques to precondition the transmitted information into two distinct channels of information. For example, in one approach referred to as beamforming, the receiver may compute a pre-coding matrix corresponding to each active carrier and send it to the transmitter. The transmitter may use complex coding and digital signal processing to prepare two different streams of information to transmit via the multichannel communications medium. Despite the use of two different streams of information, the throughput may drop due to lower transmit power for each stream of information or due to cross-talk between the physical channels. Furthermore, the digital signal processing components may add to the cost and complexity of devices implementing beamforming.

SUMMARY

Various embodiments are described in which analog signal processing may be used to implement analog signal diversity in a multichannel communications medium. Analog signal diversity in a multichannel communications system may increase throughput compared to a SISO system without requiring complex digital signal processing.

In one embodiment, a first transmission signal and a second transmission signal are prepared from a same analog signal. A phase shift may be performed on the first transmission signal. The first transmission signal may be transmitted via a first channel of a multichannel communications medium and the second transmission signal may be transmitted via a second channel of the multichannel communications medium. The phase shift may be performed by analog components in a transmitting device or a receiving device, or both the transmitting and receiving device simultaneously, to improve the performance of the communications system.

BRIEF DESCRIPTION OF THE DRAWINGS

The present embodiments may be better understood, and numerous objects, features, and advantages made apparent to those skilled in the art by referencing the accompanying drawings.

FIG. 3 depicts a transmitter implementing an embodiment of this disclosure.

FIGS. 4A-4C depict implementations of transmitter-side analog transmit diversity in accordance with various embodiments of this disclosure.

DESCRIPTION OF EMBODIMENT(S)

Figure 1:
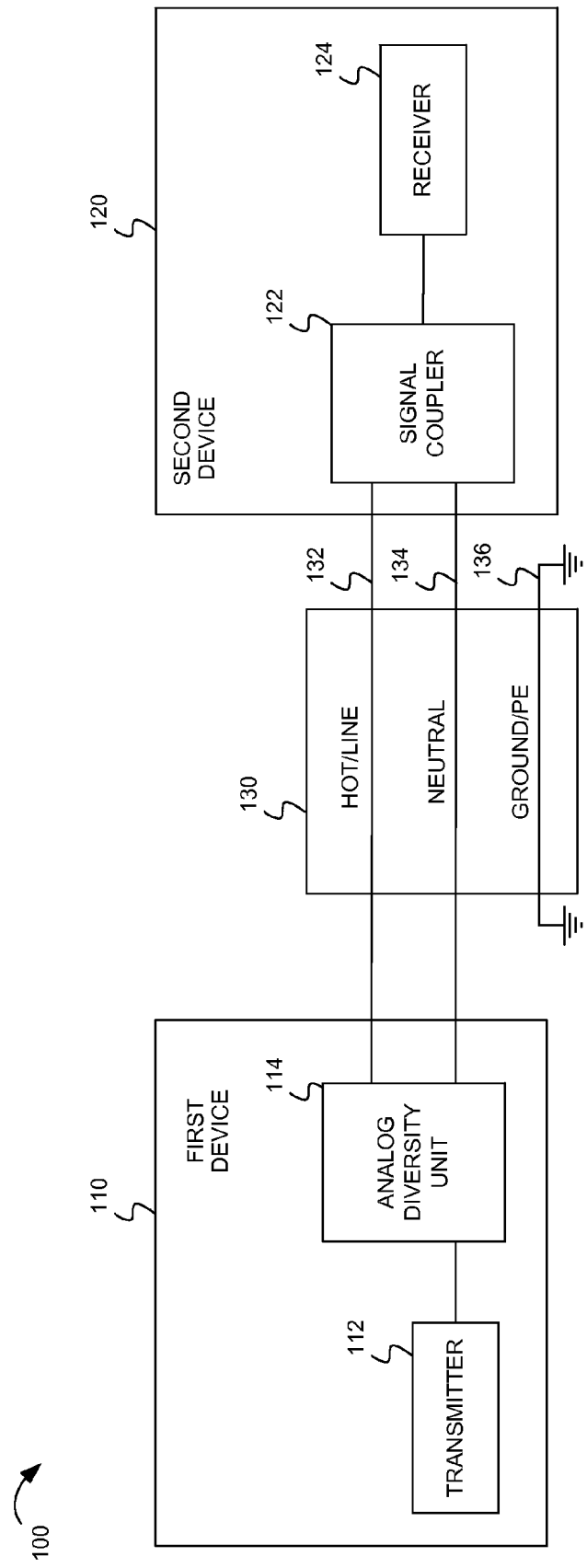
FIG. 1 depicts an example system to introduce concepts of this disclosure.

The description that follows includes exemplary systems, methods, techniques, instruction sequences and computer program products that embody techniques of the present disclosure. However, it is understood that the described embodiments may be practiced without these specific details. For instance, although examples refer to powerline communications medium, the techniques for analog signal diversity may be implemented for MIMO in other wireline or wireless communications medium. In some instances, well-known instruction instances, protocols, structures and techniques have not been shown in detail in order not to obfuscate the description.

In the examples provided in this disclosure, a multichannel communications medium may provide two physical channels for signals to be transmitted from a first device (e.g., a transmitting device) to a second device (e.g., a receiving device). In a single channel system, an analog signal may be transmitted with less concern about crosstalk. Crosstalk refers to a phenomenon in which signals transmitted in one channel or circuit creates an effect in another channel or circuit. Crosstalk may be caused by capacitive, inductive, or conductive coupling between two physical channels or circuits. In powerline communications, crosstalk may be more prevalent due to the proximity and energy of conductors in a powerline. Crosstalk causes the signals on one conductor to appear on another conductor, and may cause interference in the data at various frequencies.

When utilizing two channels on a multichannel communications medium, typically, the power that might otherwise be used for a single channel is distributed between the two channels. One approach in conventional powerline systems is to put the same data on both channels. The receiver may combine the signals from both channels. Unfortunately, this may have the effect of making the resulting data more distorted. For example, the phase of each subcarrier may vary differently for each received signal. As such, when the two channels are added together, a subcarrier in one of the channels may unpredictably add to or subtract from a corresponding subcarrier in the other channel, resulting in signal distortion. In one embodiment, multichannel analog signal selection and combining techniques may be employed for receiver side processing.

In this disclosure, a phase shift may be used on one channel so that the effect of crosstalk may be exploited to improve performance. The phase shift may be performed in an analog domain. In one embodiment, the phase shift may simultaneously affect multiple subcarriers of a transmitted signal. The same data is transmitted in the two channels as a first transmission signal and a second transmission signal. To achieve analog signal diversity, the first transmission signal is phase shifted. The amount of phase shift may be selected from a plurality of phase shift levels, including coarse levels (e.g., 90 degree, 180 degree, 270 degree, etc.) phase shifting or incremental phase shift levels (e.g., 5 degrees, 10 degree, 15 degrees, etc.). The amount of phase shift may also be determined through testing or feedback. In one embodiment, the phase shift may be performed by a receiver that receives the same analog signal via two channels.

In addition or as an alternative to phase shifting, another analog signal diversity scheme may involve changing power levels for the first and second transmission signals. A power diversity coupler may utilize cost effective analog components to independently control power levels for the first and second transmission signals being transmitted via a multichannel communications medium.

FIG. 1 depicts an example system 100 to introduce concepts of this disclosure. The example system 100 includes a first device 110 and a second device 120 coupled via a multichannel communications medium. In FIG. 1, the multichannel communications medium is depicted as a powerline communications medium 130 having a first channel 132 and a second channel 134. The first channel 132 is represented by the wire pair including the line wire (sometimes also referred to as hot or hot/line) and the ground wire 136 (sometimes also referred to as protected earth, or PE). The second channel 134 is represented by the wire pair including the neutral wire and the ground wire 136. It should be understood that other wire pairs may be used in various implementations. For example, a wire pair could include ground-line and another wire pair could include neutral-line, where the line wire provides the reference for both the ground wire and the neutral wire. For the sake of brevity, this disclosure will simply refer to the first channel 132 and second channel 134, each of which can comprise different wire pairs.

The first device 110 includes a transmitter 112 and an analog diversity unit 114. Examples of the transmitter 112 and analog diversity unit 114 are described in further detail in FIGS. 3, 4A-4C and 9. In some implementations, the analog diversity unit 114 is included as part of the transmitter 112 (as shown in FIG. 3). In other implementations, the analog diversity unit 114 may be implemented as a separate component from the transmitter 112 in a communications unit. In accordance with this disclosure, the analog diversity unit 114 may perform phase shifting and/or other analog operations to generate two transmission signals. The two transmission signals are based on the same analog signal from the transmitter 112 but are different from each other at least by the phase shifting or other analog operation.

The second device 120 includes a receiver 124 and a signal coupler 122. The signal coupler 122 may generate an analog receive signal for processing by the receiver 124. The analog receive signal generated by the signal coupler 122 may be based at least in part on the first transmission signal received via the first channel 132 as well as the second transmission signal received via the second channel 134. Examples of the signal coupler 122 and receiver 124 are further described in FIGS. 5, 6A-6C, and 8.

In one embodiment, the analog diversity unit 114 performs a phase shift on an analog transmit signal from the transmitter 112 to produce a first transmission signal for the first channel 132. The analog diversity unit 114 may also produce a second transmission signal for the second channel 134 having no phase shift or a different phase shift than the first transmission signal. The analog diversity unit 114 may utilize analog components rather than digital signal processing components.

For example, the first transmission signal may be equivalent to a 90 degree phase shift of the second transmission signal. Having a different phase, interference from the powerline communications medium 130 may not impact both the first and second transmission signals in the same way. At the signal coupler 122, the first and second transmission signals may be combined. Alternatively, the signal coupler 122 may select one of the first and second transmission signals to send as the analog receive signal to the receiver 124. Even though the first and second transmission signals may combine in the powerline communications medium 130 due to crosstalk, the resulting analog receive signal may have a higher signal-to-noise (SNR) quality metric or other performance characteristic. The throughput of the powerline communications medium 130 may be increased based on the higher SNR or other performance metric.

Figure 2:
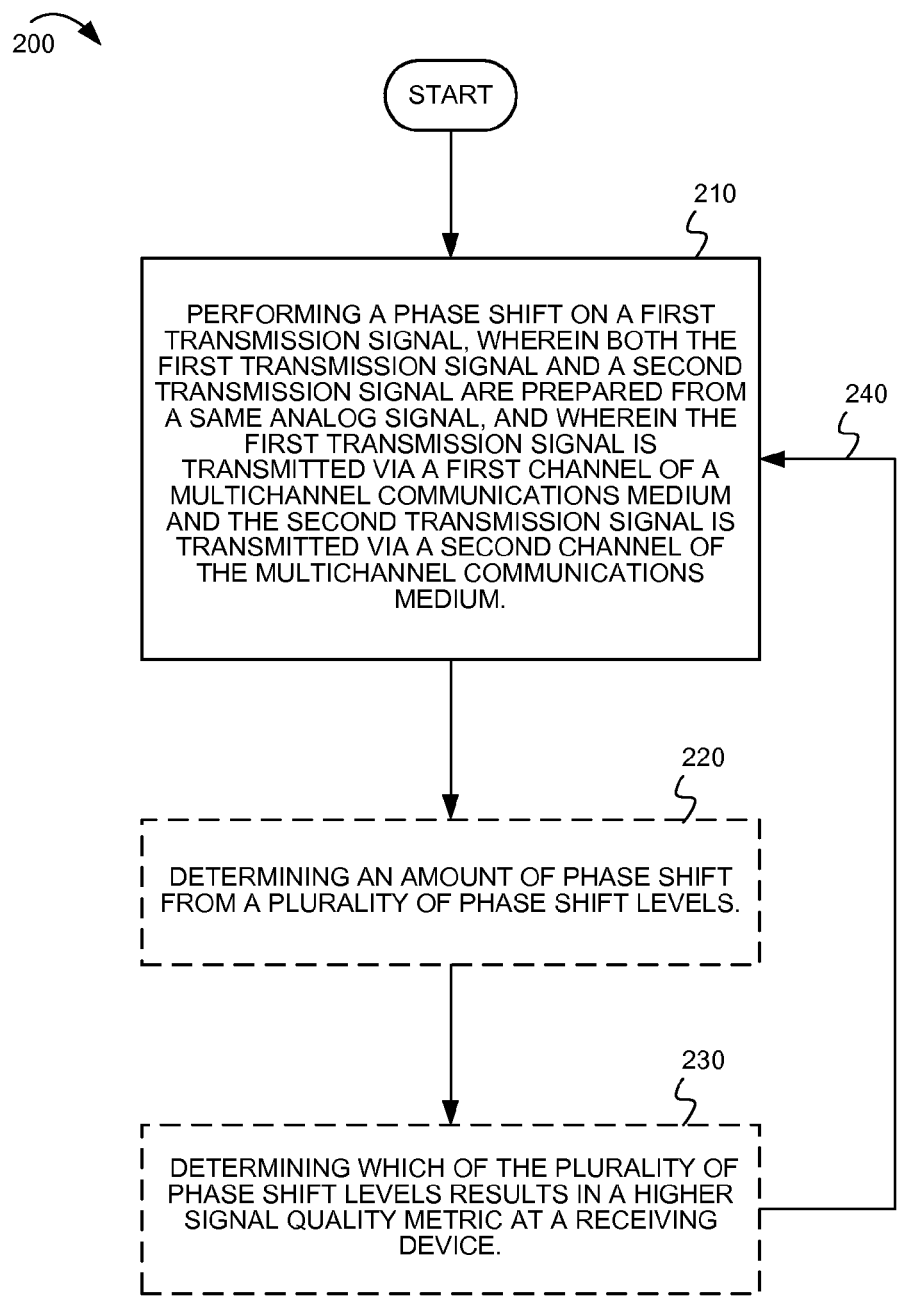
FIG. 2 depicts an example flow chart in accordance with an embodiment of this disclosure.

FIG. 2 depicts an example flow chart 200 ("flow") in accordance with an embodiment of this disclosure. At block 210, the flow may include performing a phase shift on a first transmission signal, wherein both the first transmission signal and a second transmission signal are prepared from a same analog signal, and wherein the first transmission signal is transmitted via a first channel of a multichannel communications medium and the second transmission signal is transmitted via a second channel of the multichannel communications medium. The multichannel communications medium may be a powerline communications medium, or other wireline or wireless communications medium. Wireless transceivers may involve multiple analog stages implemented at baseband frequencies, intermediate frequencies, as well as radio frequencies. The techniques presented here could be implemented at one or more of these analog stages.

At block 220, the flow may include determining an amount of phase shift from a plurality of phase shift levels. In one embodiment, the amount of phase shift on the first transmission signal may be based at least in part on the amount of crosstalk that occurs in the communications medium. In another embodiment, the amount of phase shift or the plurality of phase shift levels may be predetermined based on manufacturer design.

At block 230, the flow may include determining which of the plurality of phase shift levels results in a higher signal quality metric at a receiving device. The plurality of phase shift levels may include predetermined phase shift amounts or could be dynamically determined phase shift amounts. In one embodiment, the plurality of phase shift levels may be determined at various stages of operation. During an initial start-up stage, the phase shift levels may have coarse granularity. During subsequent tracking stages, the phase shift levels may have a finer granularity. For example, the receiving device may measure the signal quality metric for various phase shift levels and report the signal quality metrics to a transmitting device configured to determine which of the plurality of phase shift levels results in the higher signal quality metric. Alternatively, the receiving device may be configured to determine which of the plurality of phase shift levels results in the higher signal quality metric. The receiving device may communicate the determined phase shift level to a transmitting device or may implement phase shifting in a receiver-side phase shifter.

At 240, the flow may return to block 210 where the determined amount of phase shifting is used in performing the phase shift for subsequent transmission signals. For example, the flow may be performed as part of a test to determine an optimum phase shifting to maximize the signal quality metric. Alternatively, the flow may be performed during normal operation, and feedback analysis may be used to refine the amount of phase shifting based on feedback.

FIG. 3 depicts an example transmitter device 300 implementing an embodiment of this disclosure. A transmitter 301 includes a digital portion 322 and an analog portion 320. The digital portion 322 may include an encoder/modulator 336 and a digital-to-analog converter (DAC) 328. The encoder/modulator 336 may receive data from an upper layer and process the data for transmission. The encoder/modulator 336 may perform scrambling, error correction coding and interleaving operations on the data. The encoder/modulator 336 may also map groups of bits of the data onto the corresponding amplitudes of in-phase (I) and quadrature-phase (Q) components of a carrier waveform of a modulation symbol. Finally, the encoder/modulator 336 may perform an inverse discrete Fourier transform (IDFT) to form a discrete time symbol waveform. The DAC 328 converts digital data into an analog signal. It should be understood that other components (not shown) may be included in the digital portion 322 including a digital predistortion component, a digital filter, digital amplifier, or the like. The output of the DAC 328 may be sent from the digital portion 322 to a transmitter processing unit 324 in the analog portion 320.

The analog portion 320 may include a transmitter processing unit 324 with a variety of components (not shown), including an analog filter, an analog amplifier, a line driver, etc. The output of the transmitter processing unit 324 may be an analog signal that is sent to the analog diversity unit 114. The analog diversity unit 114 may prepare a first transmission signal and a second transmission signal based on the analog signal from the transmitter processing unit 324. The analog diversity unit 114 may perform phase shifting and/or other analog operations on at least the first transmission signal. The first transmission signal may be transmitted via the first channel 132 and the second transmission signal may be transmitted via the second channel 134.

FIGS. 4A-4C depict implementations of an analog diversity unit (such as analog diversity unit 114) in accordance with various embodiments of this disclosure.

FIG. 4A shows an example analog diversity unit 410 in which an analog signal input 401 (such as the analog signal from transmitter processing unit 324) is duplicated to the first transmission signal 402 and the second transmission signal 403. The example analog diversity unit 410 includes a phase shifter 412 which performs phase shifting on the first transmission signal 402. An example phase shifter is further described in FIG. 7.

FIG. 4B shows another example analog diversity unit 420 in which the analog signal input 401 is duplicated to the first transmission signal 402 and the second transmission signal 403. The example analog diversity unit 420 includes an amplifier 422 which performs power amplification on the first transmission signal 402.

FIG. 4C shows another example analog diversity unit 430 in which the analog signal input 401 is duplicated to the first transmission signal 402 and the second transmission signal 403. The example analog diversity unit 430 includes a first transformer 432 and a second transformer 434. The first and second transformers may operate as a power diversity coupler to manage power levels of each of the first transmission signal 402 and second transmission signal 403 independently. The power diversity coupler is further described in FIG. 9.

FIGS. 4A-4C are merely examples of an analog diversity unit. The items described in FIGS. 4A-4C may also be omitted or combined in various combinations. For example, an analog diversity unit may include a phase shifter (similar to phase shifter 412) and a power diversity coupler (including at least one of first transformer 432 and second transformer 434). In yet another example, the analog diversity unit may simply take the analog signal input 401 and duplicate it as the first transmission signal 402 and second transmission signal 403 without a phase shift or analog operation on the transmitter. For example, when a phase shifter is included on the receiver side, it may not be necessary to implement a phase shifter on the transmitter side.

Figure 5:
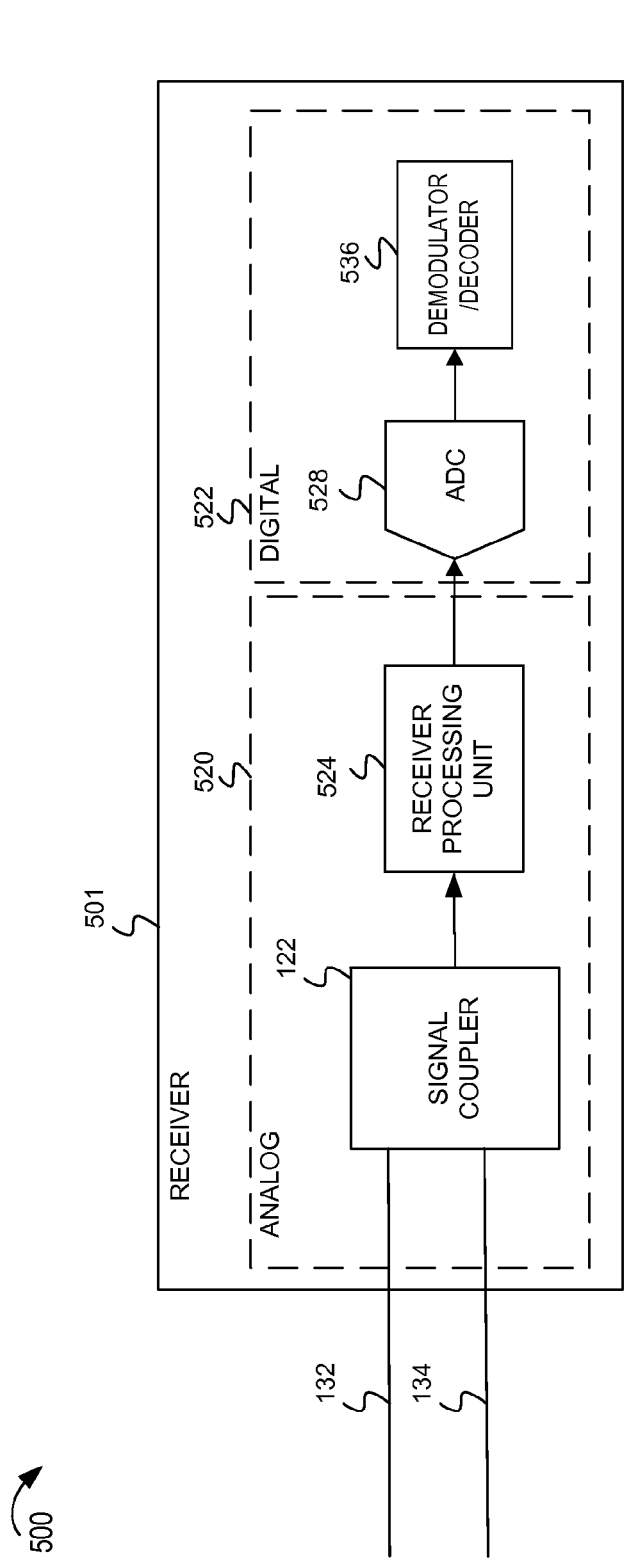
FIG. 5 depicts a receiver implementing an embodiment of this disclosure.

FIG. 5 depicts an example receiver device 500 implementing an embodiment of this disclosure. In FIG. 5, a receiver 501 includes an analog portion 520 and a digital portion 522. The analog portion 520 includes a signal coupler 122 and a receiver processing unit 524. The signal coupler 122 receives a first transmission signal via the first channel 132 and a second transmission signal via the second channel 134. The signal coupler 122 produces an analog receive signal for processing by the receiver processing unit 524. The receiver processing unit 524 may include various components (not shown), including analog filters, or the like. The receiver processing unit 524 sends the processed analog receive signal to an analog-to-digital converter (ADC) 528 of the digital portion 522. The ADC 528 converts the analog receive signal to a digital form which can be sent to the demodulator/decoder 536 for digital processing. The demodulator/decoder 536 may perform corresponding inverse operations from the operations performed by the encoder/modulator 336 (FIG. 3). For example, the demodulator/decoder 536 may perform a discrete Fourier transform to convert the received signal from time domain to frequency domain. The demodulator/decoder 536 may unmap bits from the I and Q component values, then reverse the interleaving, error correction coding, and scrambling operations performed by the encoder/modulator 336. Lastly, the demodulator/decoder 536 may send the decoded received data to a higher layer (such as a media access control, MAC, layer) of the device.

Figure 6C:
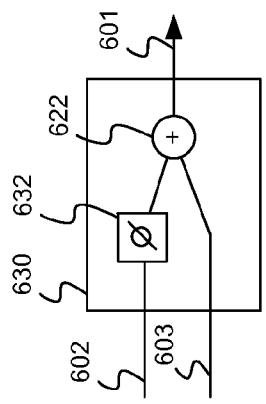
FIGS. 6A-6C depict implementations of receiver-side analog diversity in accordance with various embodiments of this disclosure.
Figure 6B:
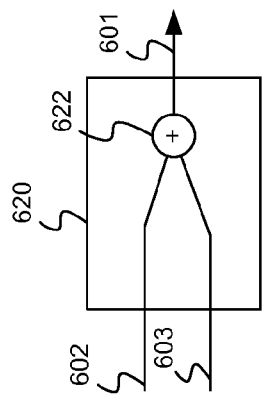
Figure 6A:
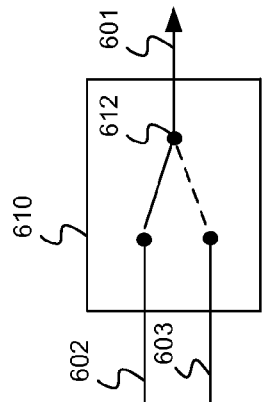

Several examples of the signal coupler 122 are described in FIGS. 6A-6C. As with the example analog diversity units of FIGS. 4A-4C, it should be understood that the features of FIGS. 6A-6C may be omitted or combined in various embodiments.

FIG. 6A shows an example signal coupler 610 that receives the first transmission signal 602 and second transmission signal 603 as inputs. A switch 612 is included in the example signal coupler 610. The switch 612 may select one of the first transmission signal 602 and second transmission signal 603 as the analog receive signal 601 to send to the receiver processing unit 524. In some embodiments, the example signal coupler 610 may have two switches (not shown), one for each of the inputs so that the example signal coupler 610 can selectively pass either: the first transmission signal 602, the second transmission signal 603, or a combination of first transmission signal 602 and second transmission signal 603. The switch 612 may be controlled by a controller (not shown) associated with the receiver. The controller may direct the switch 612 to select whichever input or inputs yield the highest signal quality metric by the receiver.

FIG. 6B shows an example signal coupler 620 that receives the first transmission signal 602 and second transmission signal 603 as inputs. The example signal coupler 620 includes a signal combiner 622 that combines the inputs to produce the analog receive signal 601.

FIG. 6C shows an example signal coupler 630 that receives the first transmission signal 602 and second transmission signal 603 as inputs. The example signal coupler 630 includes a phase shifter 632 and a signal combiner 622. The phase shifter 632 may be similar to the phase shifter 730 described in FIG. 7.

Figure 7:
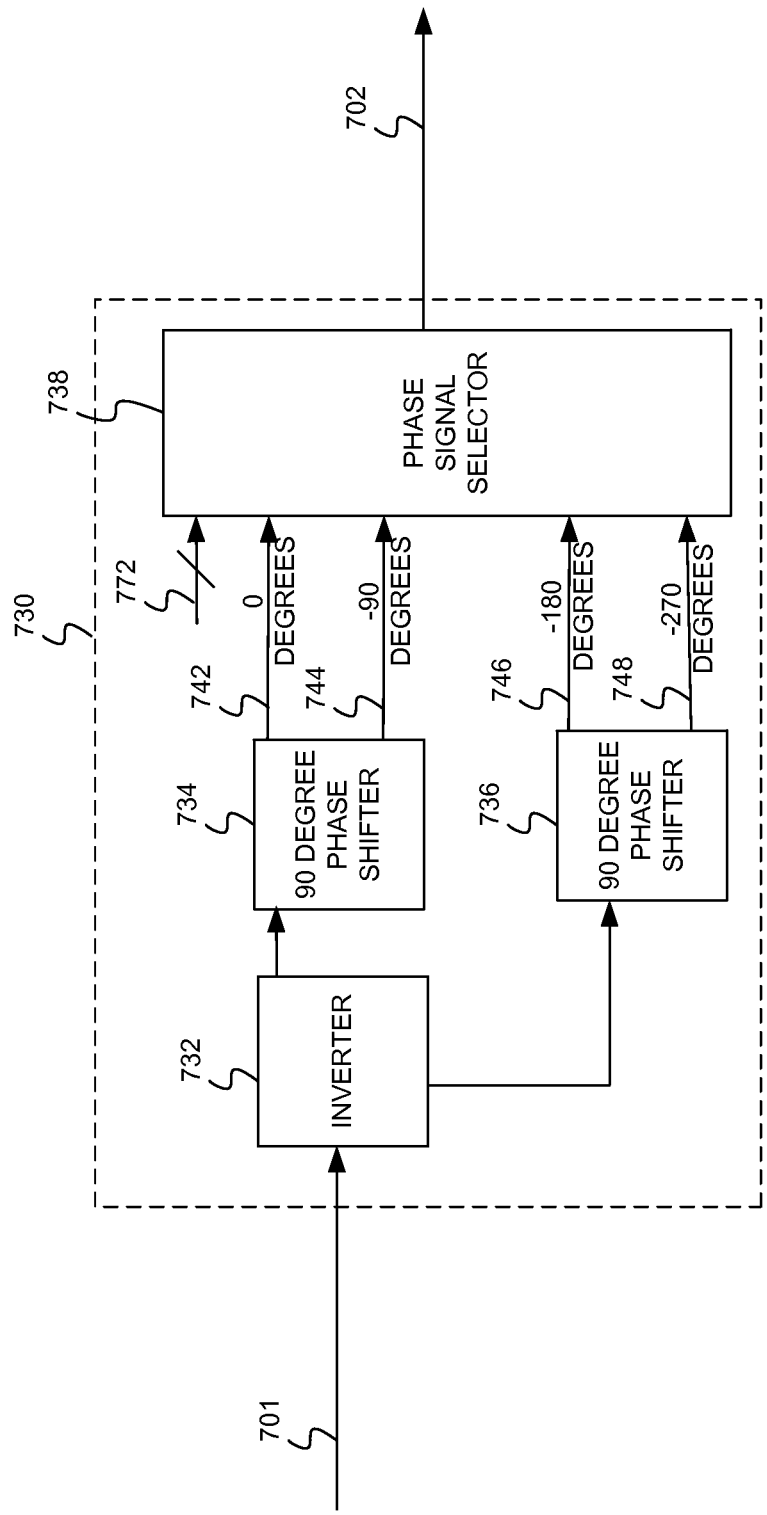
FIG. 7 depicts a phase shifter in accordance with an embodiment of this disclosure.

FIG. 7 depicts a phase shifter 730 in accordance with an embodiment of this disclosure. The phase shifter 730 may be used, in some embodiments, as phase shifter 412 or phase shifter 632. The phase shifter 730 receives an input 701 and produces an output 702 that may be phase shifted. For example, if the phase shifter 730 is implemented on the receiver side, the input 701 would be a first transmission signal via a first channel 132 and the output 702 would be an analog receive signal to send to other components of the receiver. Alternatively, if the phase shifter 730 is implemented on the transmitter side, the input 701 would be an analog signal prepared for transmission. The output would be the first transmission signal having a phase shift relative to the analog signal.

The phase shifter 730 is an example which uses analog components to cause a phase shift to an input. Phase shifter 730 provides a plurality of phase shift levels. It should be noted that phase shifter 730 provides large incremental steps between phase shift levels, while other example phase shifters might provide smaller incremental steps or variable phase shift levels.

Phase shifter 730 includes an inverter 732 and two 90 degree phase shifters, first 90 degree phase shifter 734 and second 90 degree phase shifter 736. The inverter 732, first 90 degree phase shifter 734, and second 90 degree phase shifter 736 each provide two outputs: one of the outputs is unshifted from the input, and the other output is a shifted output. For example, the inverter 732 receives input 701 and produces a first output to the first 90 degree phase shifter 734. The first output is the same phase as the input 701. The inverter 732 also produces a second output which is sent to the second 90 degree phase shifter 736. The second output is 180 degrees shifted (e.g., inverted) from the input 701.

The first 90 degree phase shifter 734 produces two outputs: a first phase shifted signal 742 has no phase shift since it was the unshifted output from the first 90 degree phase shifter 734 and the input of the first 90 degree phase shifter 734 was unshifted output from the inverter 732. The first 90 degree phase shifter 734 also produces a second phase shifted signal 744 which has a 90 degree phase shift.

The second 90 degree phase shifter 736 has a 180 degree phase shifted signal as the input and therefore the unshifted output of the second 90 degree phase shifter 736 is still 180 degrees shifted. The third phase shifted signal 746 is the 180 degree phase shifted signal. The fourth phase shifted signal 748 is the other output of the second 90 degree phase shifter 736, and fourth phase shifted signal 748 represents a 270 degree phase shifted signal.

Therefore, in the configuration of FIG. 7, the inverter 732, first 90 degree phase shifter 734, and second 90 degree phase shifter 736, are cascaded in such a way that they produce a plurality of phase shifted signals. The plurality of phase shifted signals are sent to a phase signal selector 738 which can select one of the plurality of phase shifted signals to send as output 702. In one embodiment, the phase signal selector 738 may be controlled by a control input 772. The control input 772 may be from a controller, processor, etc. which controls the phase signal selector 738 to select one of the plurality of phase shifted signals based on signal quality metrics associated with each phase shifted signal. For example, a training sequence or test might be conducted to check the signal quality that would result from using each of the plurality of phase shifted signals. The phase shifted signal that yields the highest quality signal may be selected as the output 702.

Figure 8:
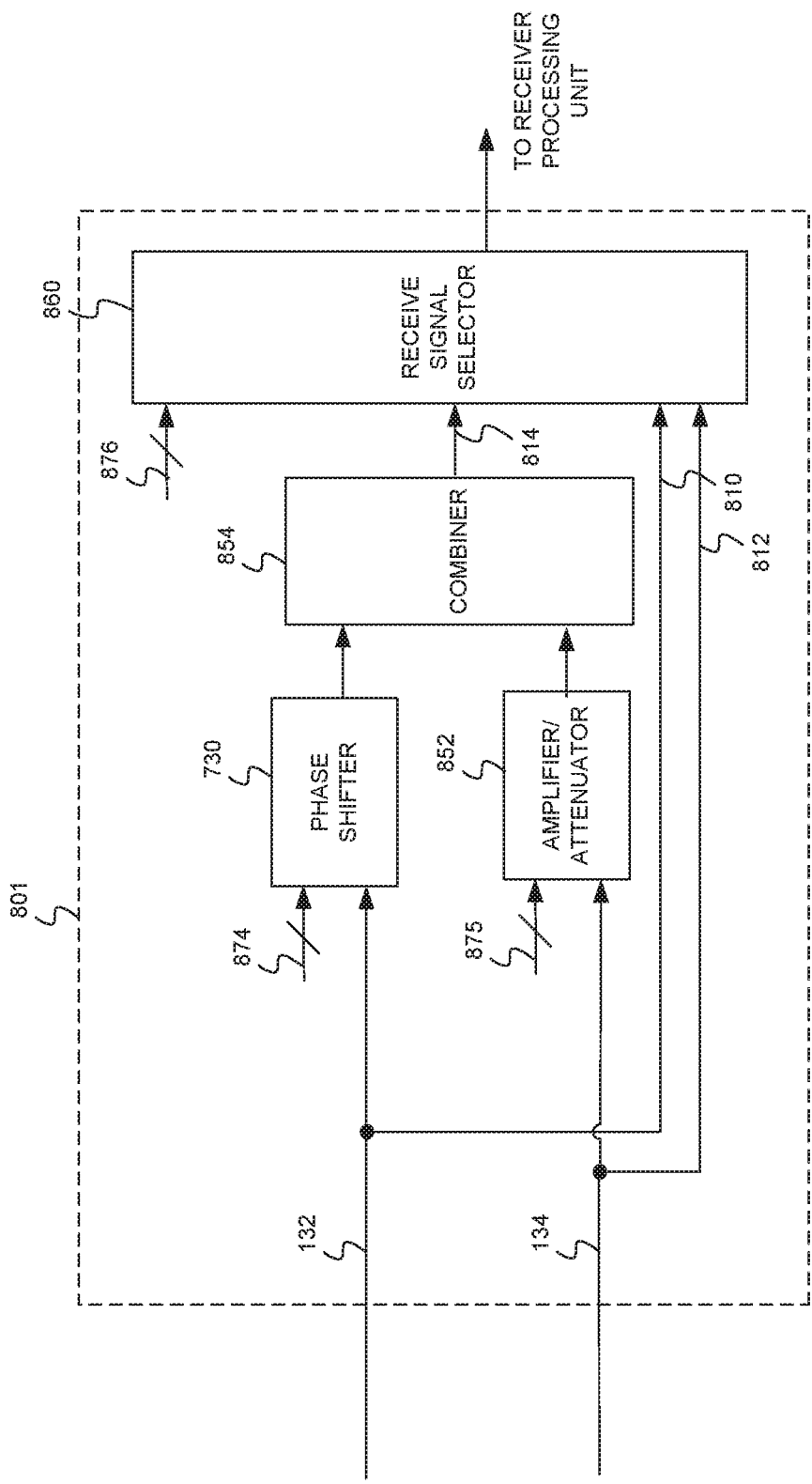
FIG. 8 depicts a receiver capable of combining phase shift diversity and amplitude diversity in accordance with an embodiment of this disclosure.

FIG. 8 depicts an example signal coupler 801 capable of combining phase shift diversity and amplitude diversity in accordance with an embodiment of this disclosure. The example signal coupler 801 is configured to receive a first transmission signal via first channel 132 and a second transmission signal via second channel 134. The first transmission signal is used as an input (such as input 701) to the phase shifter 730. The output of the phase shifter is a phase shifted signal and is sent to the combiner 854. Control input 874 may control which phase shifted signal is used as the output of the phase shifter 730. For example, the control input 874 may control how much phase shifting is performed by the phase shifter 730.

The second transmission signal is sent to an amplifier/attenuator 852 that is configured to amplify or attenuate the second transmission signal. For example, a power shift might be performed. The output of the power shifted second transmission signal is sent to the combiner 854. The amplifier/attenuator 852 may be controlled or adjusted by control input 875.

The combiner 854 may combine the phase shifted signal and the power shifted signal to produce a combined signal 814. It should be understood that control inputs 874, 875 may be adjusted to providing weighting to each of the phase shifter 730 and amplifier/attenuator 852, respectively. For example, different values of control inputs 874, 875 could be used to negate phase shifting in favor of power shifting, or vice versa. With the two degrees of freedom, it is possible to prepare a conditioned signal as the combined signal 814.

The combined signal 814, as well as the unconditioned first transmission signal 810 and second transmission signal 812 may be sent to a receive signal selector 860. A control input 876 may cause the receive signal selector 860 to select one of possible signals (combined signal 814, first transmission signal 810, and second transmission signal 812) to send as the analog receive signal to the ADC. The control inputs 874-876 may be controlled by a process or other controller configured to tune the example signal coupler 801. The control inputs 874-876 may be generated by signal processing logic (not shown) on the receiving communications device, such as the second device 120 in FIG. 1. The receiving communications device may employ a variety of algorithms to maximize the quality of the received signal.

Figure 9:
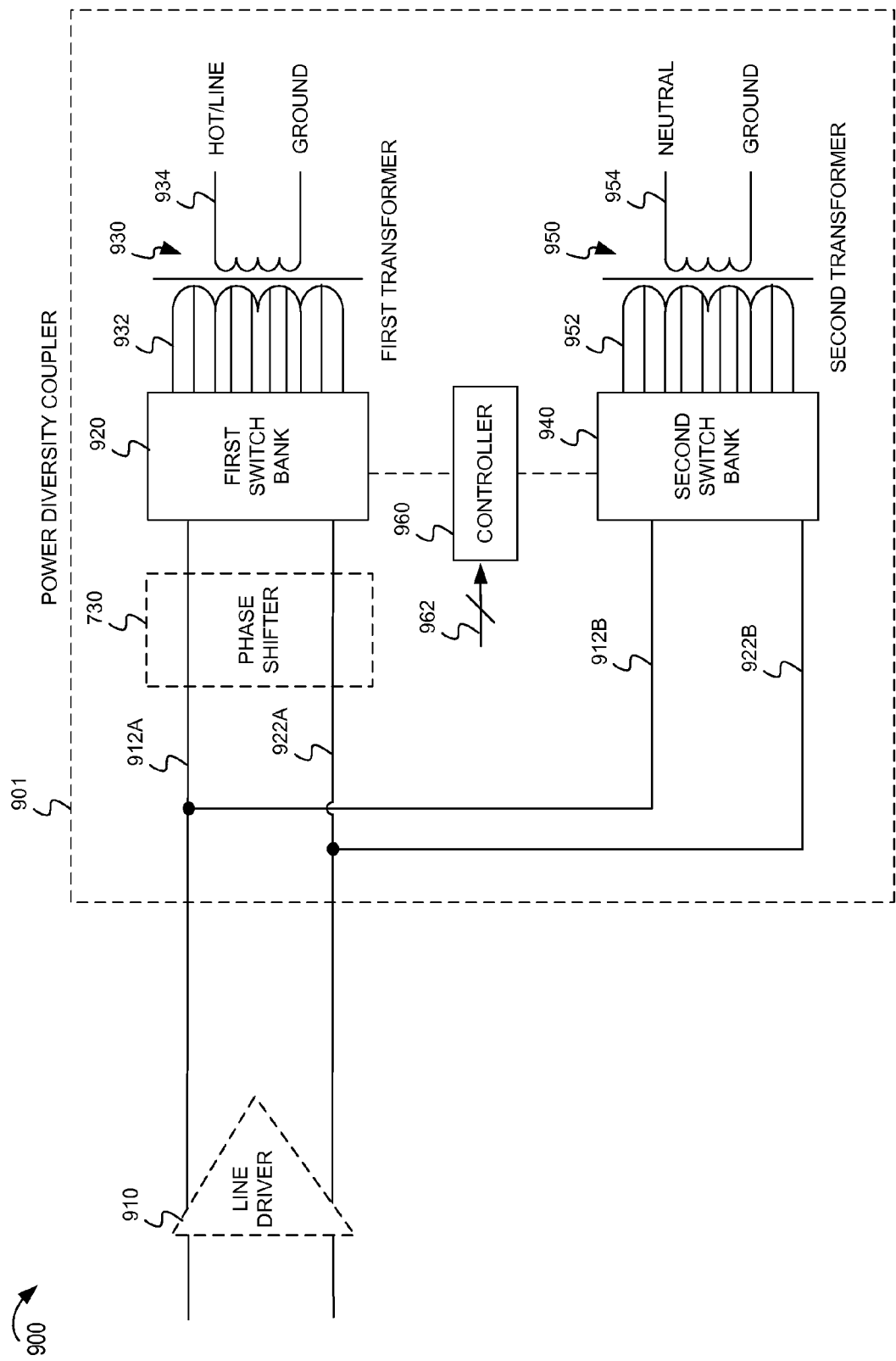
FIG. 9 depicts a transmitter capable of implementing amplitude diversity in accordance with an embodiment of this disclosure.

FIG. 9 depicts a transmitter 900 capable of implementing amplitude diversity in accordance with an embodiment of this disclosure. The technique illustrated in FIG. 9 may provide comparable performance as a digital signal processing technique. The use of analog components to implement amplitude diversity may provide a less complex and more cost effective architecture than digital signal processing.

FIG. 9 shows a power diversity coupler 901 capable of independently adjusting power shift for a first transmission signal and a secondary transmission signal. The power diversity coupler 901 may be used with or without a phase shifter 730. A line driver 910 or other analog portion of the transmitter may generate outputs which represent an analog signal. The outputs of the line driver 910 are inputs 912A, 922A to the power diversity coupler 901. The inputs 912A, 922A are duplicated as 912B, 922B so that there is a second copy of the analog signal. As an example, the input 912A may represent the first transmission signal and the input 912B may represent the second transmission signal. Inputs 922A and 922B may be a reference wire that is used by both the first and second transmission signals.

In the scenario where a phase shifter 730 is utilized, the phase shifter 730 may shift the first transmission signal (on input 912A as compared to reference input 922A). However, it should be understood that the embodiment in FIG. 9 may be used without a phase shifter. The power diversity coupler 901 may be used to provide power diversity between the first transmission signal and the second transmission signal for enhanced reception.

The power diversity coupler 901 includes a first switch bank 920 for coupling the first transmission signal to a primary side 932 of a first transformer 930. The first switch bank 920 is capable of coupling the first transmission signal at one of a first plurality of connections of the primary side 932 of the first transformer 930. Each of the first plurality of connections may be associated with different turns ratios of the first transformer 930. The first transformer 930 also has a secondary side 934 which couples to the first channel. Depending on which connection on the primary side 932 is used to couple the inputs 912A, 922A to the first transformer 930, there may be a voltage gain or drop at the secondary side 934 with respect to the primary side 932 when the first transmission signal is inductively coupled to the secondary side 934.

The power diversity coupler 901 may also include a second switch bank 940 and second transformer 950 having a primary side 952 and secondary side 954. The second switch bank 940, second transformer 950, a primary side 952, and secondary side 954 may operate similar to the first switch bank 920, first transformer 930, primary side 932, and secondary side 934, respectively.

The power diversity coupler 901 may also include a controller 960 configured to control the first switch bank 920 to couple the first transmission signal at the one of the first plurality of connections of the primary side 932 of the first transformer 930. The connection on the primary side 932 may be associated with a first turns ratio that causes a change in power level of the first transmission signal at the secondary side 934 of the first transformer 930. The controller 960 may also control the second switch bank 940 if the second switch bank 940 is included in the power diversity coupler 901. The controller 960 may be responsive to a control input 962, such as a control signal from a processor, software, or other control architecture associated with a transmitter.

Figure 10:
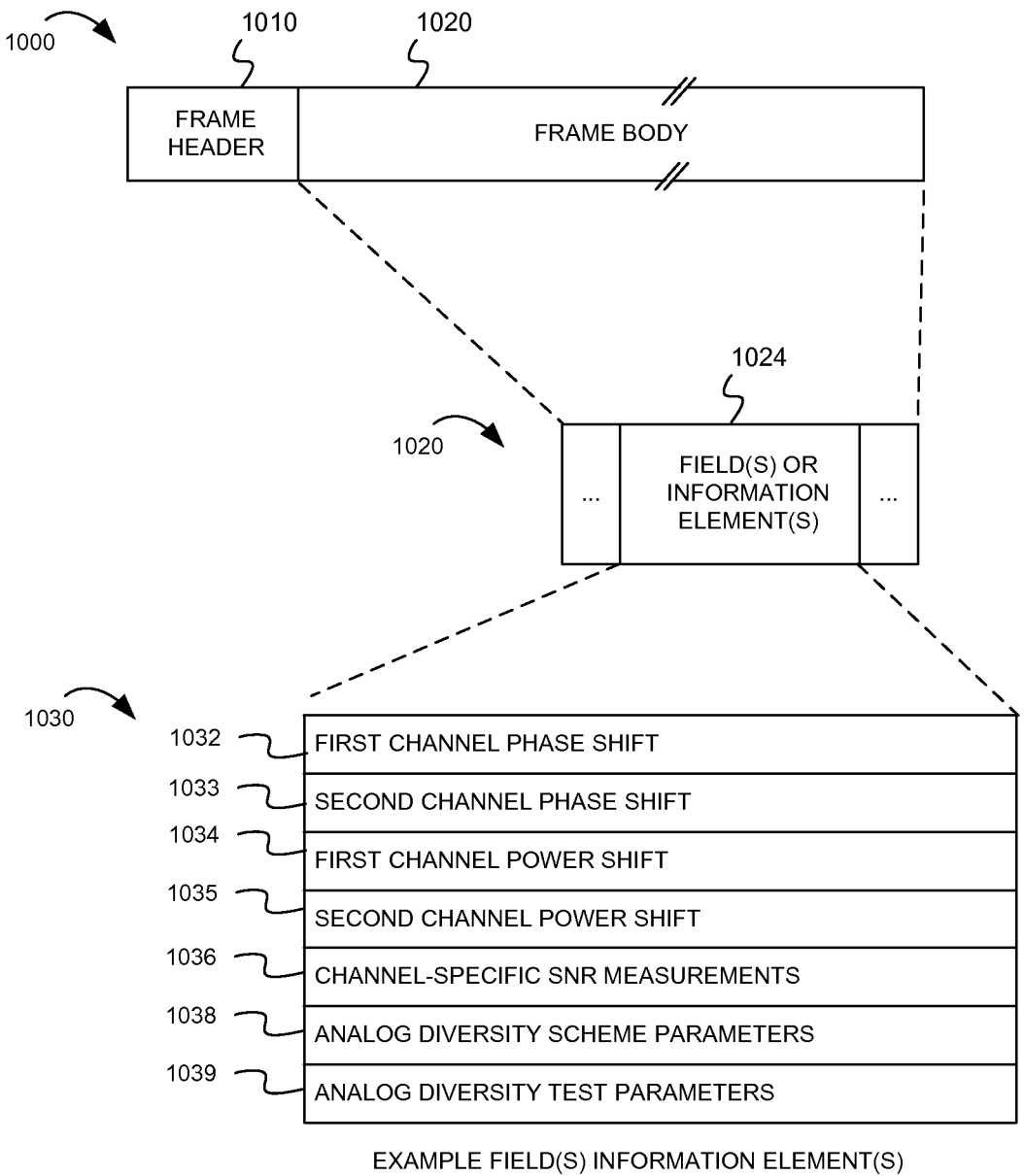
FIG. 10 depicts an example message format that may be used to communicate about analog signal diversity in accordance with an embodiment of this disclosure.

FIG. 10 depicts an example message format 1000 in accordance with an embodiment of this disclosure. The example message format 1000 includes a frame header 1010 and frame body 1020. The frame body 1020 may include one or more fields or information elements 1024. Depending on the type of message, the fields or information element 1024 may include different types of analog signal diversity information 1030. Example analog signal diversity information 1030 may include:

First channel phase shift 1032: This information may indicate an amount of phase shift that is being performed or that should be performed for a first transmission signal transmitted via a first channel.

Second channel phase shift 1033: This information may indicate an amount of phase shift that is being performed or that should be performed for a second transmission signal transmitted via a second channel.

First channel power shift 1034: This information may indicate an amount of power shift that is being performed or that should be performed for a first transmission signal transmitted via a first channel.

Second channel power shift 1035: This information may indicate an amount of power shift that is being performed or that should be performed for a second transmission signal transmitted via a second channel.

Channel-specific SNR measurements 1036: This information may include signal quality measurements, such as SNR or other metrics. This information may be used by a recipient of the message to determine an amount of phase shift or power shift should be performed on the first transmission signal.

Analog diversity scheme parameters 1038: This information may indicate whether phase shift or power shift (or both) are to be used in the multichannel communications medium. The analog diversity scheme parameters may also indicate whether the transmitter or receiver (or both) is to perform the analog signal diversity features.

Analog diversity test parameters 1039: This information may indicate timing, test sequence, or other parameters of a test to determine analog diversity scheme parameters. For example, the analog diversity test parameters may identify a predetermined test sequence sent by a transmitter to a receiver via a multichannel communications medium. During the predetermined test sequence, the receiver may measure signal quality metrics associated with each of a plurality of phase shift levels. The signal quality metrics may be used to determine an amount of phase shift to perform on a particular transmission signal for one or more of the channels.

Figure 11:
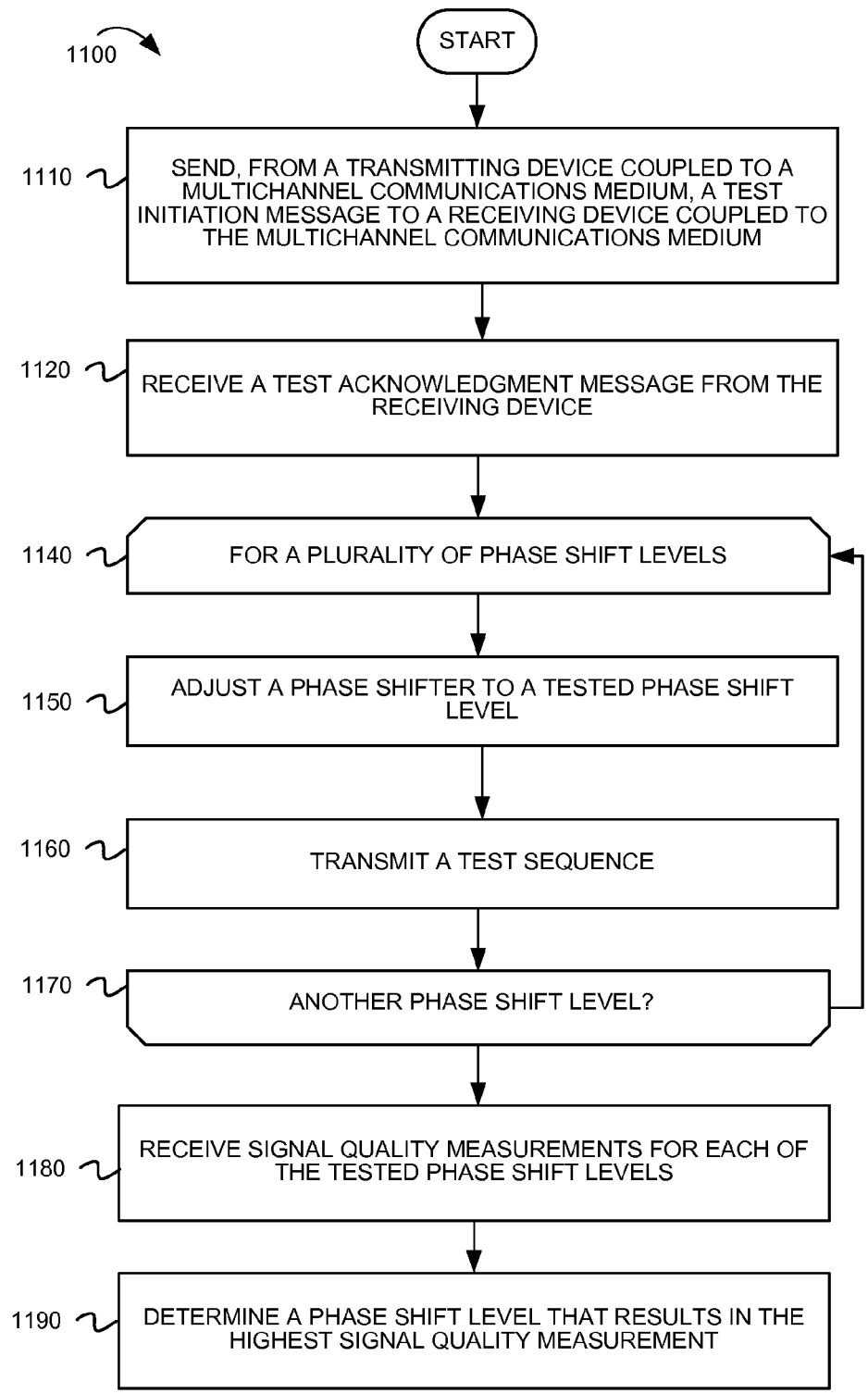
FIG. 11 depicts an example flow for determining a phase shift level in accordance with an embodiment of this disclosure.

FIG. 11 depicts an example flow 1100 for determining a phase shift level in accordance with an embodiment of this disclosure.

At 1110, a transmitting device coupled to a multichannel communications medium may send a test initiation message to a receiving device coupled to the multichannel communications medium. The test initiation message may indicate that a test will be performed to determine a phase shift level that improves signal quality at the receiver.

At 1120, the transmitting device may receive a test acknowledgment message from the receiving device.

At 1140, the transmitting device may loop through a plurality of phase shift levels. Each of the plurality of phase shift levels may be tested (referred to as tested phase shift levels) for the operations in 1150 and 1160.

At 1150, the transmitting device may adjust a phase shifter to a tested phase shift level. At 1160, the transmitting device may transmit a test sequence using the tested phase shift level. Meanwhile, the receiving device may measure and record a signal quality measurement for each tested phase shift level. At 1170, the transmitting device may determine if another phase shift level should be tested, in which case the flow returns to operations 1140-1160. If no more phase shift levels will be tested, the flow continues to 1180.

At 1180, the transmitting device may receive signal quality measurements, from the receiving device, for each of the tested phase shift levels.

At 1190, the transmitting device may determine a phase shift level that results in the highest signal quality measurement.

FIGS. 1-11 and the operations described herein are examples meant to aid in understanding various embodiments and should not be used to limit the scope of the claims. Embodiments may perform additional operations, fewer operations, operations in parallel or in a different order, and some operations differently.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "unit" or "system." Furthermore, aspects of the present disclosure may take the form of a computer program product embodied in one or more computer readable medium(s) having computer readable program code embodied thereon.

Any combination of one or more non-transitory computer readable medium(s) may be utilized, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 12:
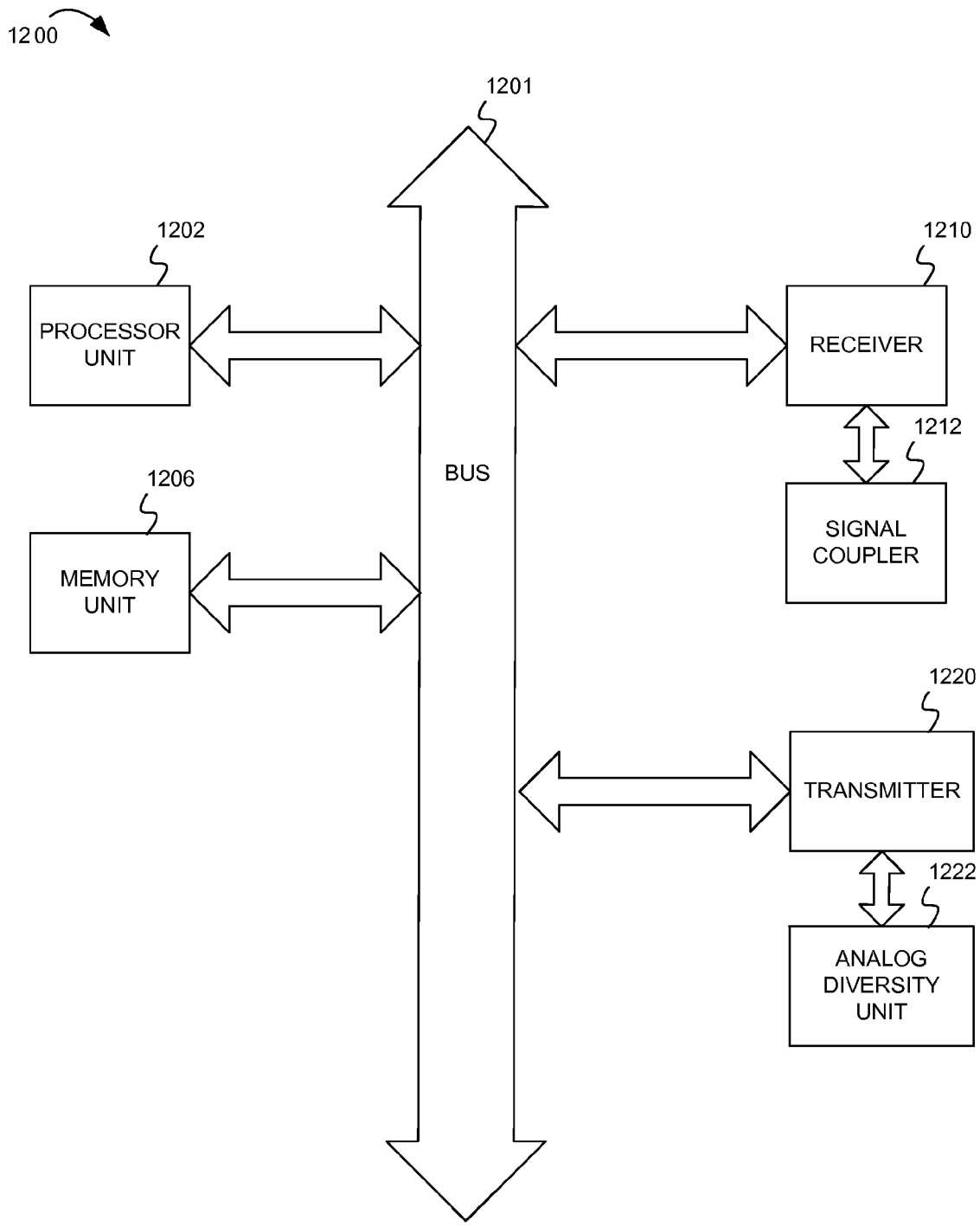
FIG. 12 depicts an electronic device capable of implementing various embodiments of this disclosure.

FIG. 12 is an example block diagram of one embodiment of an electronic device 1200 capable of implementing various embodiments of this disclosure. In some implementations, the electronic device 1200 may be an electronic device such as a laptop computer, a tablet computer, a mobile phone, a powerline communications device, a gaming console, or other electronic systems. In some implementations, the electronic device may comprise functionality to communicate across multiple communications networks (which form a hybrid communications network). The electronic device 1200 includes a processor unit 1202 (possibly including multiple processors, multiple cores, multiple nodes, and/or implementing multi-threading, etc.). The electronic device 1200 includes a memory unit 1206. The memory unit 1206 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1200 also includes a bus 1201 (e.g., PCI, ISA, PCI-Express, HyperTransport®, InfiniBand®, NuBus, AHB, AXI, etc.). The electronic one or more network interfaces that may be a wireless network interface (e.g., a WLAN interface, a Bluetooth® interface, a WiMAX interface, a ZigBee® interface, a Wireless USB interface, etc.) or a wired network interface (e.g., a powerline communications interface, an Ethernet interface, etc.). The electronic device 1200 may include a transmitter 1220 and a receiver 1210. Together the transmitter 1220 and receiver 1210 may comprise a network interface. The electronic device 1200 may include a signal coupler 1212 (similar to signal coupler 122, 610, 620, 630, 801) and/or an analog diversity unit 1222 (similar to analog diversity unit 114, 410, 420, 430 or power diversity coupler 901) configured to implement various embodiments described in the forgoing figures.

Any one of these functionalities may be partially (or entirely) implemented in hardware and/or on the processor unit 1202. For example, the functionality may be implemented with an application specific integrated circuit, in logic implemented in the processor unit 1202, in a co-processor on a peripheral device or card, etc. Further, realizations may include fewer or additional components not illustrated in FIG. 11 (e.g., video cards, audio cards, additional network interfaces, peripheral devices, etc.). The processor unit 1202, the memory unit 1206, transmitter 1220, and receiver 1210 may be coupled to the bus 1201. Although illustrated as being coupled to the bus 1201, the memory unit 1206 may be directly coupled to the processor unit 1202.

While the embodiments are described with reference to various implementations and exploitations, it will be understood that these embodiments are illustrative and that the scope of the present disclosure is not limited to them. In general, techniques for analog signal diversity as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A device comprising:
   a transmitter having an analog portion configured to produce an analog signal for transmission via a multichannel communications medium; and
   an analog diversity unit configured to:
     perform phase shift operations on the analog signal, the phase shift operations producing a plurality of phase shifted signals,
     select one of the plurality of phase shifted signals as a first transmission signal,
     prepare a second transmission signal as a duplicate of the analog signal, wherein the first transmission signal is different from the second transmission signal by a phase shift, an amplitude shift, or a combination thereof,
     couple the first transmission signal to a first channel of the multichannel communications medium, and
     couple the second transmission signal to a second channel of the multichannel communications medium.

2. The device of claim 1, wherein the analog diversity unit is further configured to determine an amount of the phase shift based, at least in part, on a signal quality measurement at a receiver coupled to the multichannel communications medium.

3. The device of claim 1, wherein the phase shift causes a gain in the first transmission signal, the gain associated with crosstalk between the first channel and the second channel.

4. The device of claim 1, wherein the analog diversity unit is further configured to change an amount of phase shift based, at least in part, on channel conditions.

5. The device of claim 1, wherein the analog diversity unit comprises:
   a phase shifter configured to perform the phase shift operations; and
   a phase signal selector configured to select the one of the plurality of phase shifted signals.

6. The device of claim 1, wherein the analog diversity unit is included with the analog portion in the transmitter.

7. The device of claim 1,
   wherein the analog diversity unit is further configured to perform an amplitude shift using a power diversity coupler, the power diversity coupler comprising:
     a first switch bank for coupling the first transmission signal at one of a first plurality of connections of a primary side of a first transformer, the first plurality of connections associated with different turns ratios of the first transformer;
     the first transformer having the primary side for coupling to the first switch bank and a secondary side for coupling to the first channel; and
     a controller configured to control to which one of the first plurality of connections the first switch bank will couple the first transmission signal.

8. The device of claim 7, wherein the power diversity coupler further comprises:
   a second switch bank for coupling the second transmission signal at one of a second plurality of connections of a primary side of a second transformer, the second plurality of connections associated with different turns ratios of the second transformer;
   the second transformer having the primary side for coupling to the second switch bank and a secondary side for coupling to the second channel; and
   wherein the controller is further configured to control to which one of the second plurality of connections the second switch bank will couple the second transmission signal.

9. The device of claim 8, wherein the controller is configured to independently control the first switch bank and the second switch bank such that the first switch bank will couple to a first connection of the first transformer and the second switch bank will couple to a second connection of the second transformer, wherein the first connection associated with a first turns ratio and the second connection associated with a second turns ratio different from the first turns ratio.

10. A device comprising:
    a receiver having an analog portion configured to process an analog receive signal; and
    a signal coupler configured to:
      receive a first transmission signal via a first channel of a multichannel communications medium,
      receive a second transmission signal via a second channel of the multichannel communications medium, wherein the first transmission signal and the second transmission signal are duplicates of an analog transmit signal, and wherein the first transmission signal is different from the second transmission signal by a phase shift, an amplitude shift, or a combination thereof,
      perform phase shift operations on the first transmission signal in an analog domain, the phase shift operations producing a plurality of phase shifted signals,
      select one of the plurality of phase shifted signals as a selected phase shifted receive signal,
      determine the analog receive signal based, at least in part, on a combination of the selected phase shifted receive signal and the second transmission signal, and
      provide the analog receive signal to the analog portion of the receiver.

11. The device of claim 10, wherein the signal coupler comprises:
    a phase shifter configured to perform the phase shift operations; and
    a receive signal selector configured to select the selected phase shifted receive signal.

12. The device of claim 10, further comprising:
    an amplifier/attenuator configured to perform the amplitude shift.

13. The device of claim 10, wherein the signal coupler is further configured to select, as the analog receive signal, one of the group consisting of the first transmission signal, the second transmission signal, and the combination of the phase shifted receive signal and the second transmission signal.

14. The device of claim 13, wherein the signal coupler is configured to determine the analog receive signal based, at least in part, on a first signal quality of the first transmission signal compared to a second signal quality of the second transmission signal.

15. A method of communicating in a network, the method comprising:
performing phase shift operations on an analog signal from an analog portion of a transmitter, the phase shift operations producing a plurality of phase shifted signals;
selecting one of the plurality of phase shifted signals as a first transmission signal;
preparing a second transmission signal as a duplicate of the analog signal, wherein the first transmission signal is different from the second transmission signal by a phase shift, an amplitude shift, or a combination thereof;
transmitting the first transmission signal via a first channel of a multichannel communications medium; and
transmitting the second transmission signal via a second channel of the multichannel communications medium.

16. The method of claim 15, wherein performing the phase shift comprises:
determining an amount of the phase shift from a plurality of phase shift levels.

17. The method of claim 16, further comprising:
determining which of the plurality of phase shift levels improves signal quality at a receiving device.

18. The method of claim 15, further comprising performing the plurality of phase shifts while the first transmission signal is transmitted from a transmitting device to a receiving device, wherein the first transmission signal comprises a test sequence.

19. A method of communicating in a network, the method comprising:
receiving a first transmission signal via a first channel of a multichannel communications medium;
receiving a second transmission signal via a second channel of the multichannel communications medium, wherein the first transmission signal and the second transmission signal are duplicates of an analog transmit signal, and wherein the first transmission signal is different from the second transmission signal by a phase shift, an amplitude shift, or a combination thereof;
performing phase shift operations on the first transmission signal in an analog domain, the phase shift operations producing a plurality of phase shifted signals;
selecting one of the plurality of phase shifted signals as a selected phase shifted receive signal;
determining an analog receive signal based, at least in part, on a combination of the selected phase shifted receive signal and the second transmission signal; and
providing the analog receive signal to an analog portion of a receiver.

20. The method of claim 19, wherein determining the analog receive signal comprises amplifying or attenuating the second transmission signal.

21. The method of claim 19, wherein determining the analog receive signal comprises selecting, as the analog receive signal, one of the group consisting of the first transmission signal, the second transmission signal, and the combination of the phase shifted receive signal and the second transmission signal.

22. The method of claim 21, wherein determining the analog receive signal is based, at least in part, on a first signal quality of the first transmission signal compared to a second signal quality of the second transmission signal.

* * * * *